(12) United States Patent
Pickren et al.

(10) Patent No.: US 10,239,283 B2
(45) Date of Patent: Mar. 26, 2019

(54) FABRIC REINFORCED TRACTION MAT

(71) Applicant: Marine Mat, Inc., Oldsmar, FL (US)

(72) Inventors: Gregory Bernard Pickren, Oldsmar, FL (US); John William Salvatore, Trinity, FL (US)

(73) Assignee: MARINE MAT, INC., Oldsmar, FL (US)

( * ) Notice: Subject to any disclaimer, the term of this patent is extended or adjusted under 35 U.S.C. 154(b) by 0 days.

(21) Appl. No.: 15/403,271

(22) Filed: Jan. 11, 2017

(65) Prior Publication Data

US 2017/0120557 A1    May 4, 2017

Related U.S. Application Data

(63) Continuation-in-part of application No. 14/863,508, filed on Sep. 24, 2015.

(Continued)

(51) Int. Cl.
*B32B 5/24* (2006.01)
*B32B 5/18* (2006.01)
(Continued)

(52) U.S. Cl.
CPC ............. *B32B 5/245* (2013.01); *B32B 3/06* (2013.01); *B32B 3/08* (2013.01); *B32B 3/30* (2013.01); *B32B 5/024* (2013.01); *B32B 5/06* (2013.01); *B32B 5/18* (2013.01); *B32B 5/22* (2013.01); *B32B 7/12* (2013.01); *B32B 27/12* (2013.01); *B32B 27/304* (2013.01); *B32B 37/10* (2013.01); *B32B 37/12* (2013.01); *B32B 37/182* (2013.01); *B60N 3/044* (2013.01); *B60N 3/048* (2013.01); *B63B 3/48* (2013.01); *B32B 37/02* (2013.01); *B32B 38/10* (2013.01); *B32B 2038/045* (2013.01); *B32B 2250/02* (2013.01); *B32B 2250/03* (2013.01); *B32B 2250/44* (2013.01); *B32B 2255/02* (2013.01); *B32B 2255/26* (2013.01); *B32B 2262/02* (2013.01); *B32B 2262/0246* (2013.01); *B32B 2262/0261* (2013.01); *B32B 2262/0276* (2013.01); *B32B 2262/0292* (2013.01); *B32B 2262/04* (2013.01);

(Continued)

(58) Field of Classification Search
CPC ...................................................... B32B 5/245
USPC ............................................................. 428/99
See application file for complete search history.

(56) References Cited

U.S. PATENT DOCUMENTS 5,806,909 A * 9/1998 Wise ..................... B60R 13/01
296/39.1
6,258,862 B1   7/2001 Matz et al.
(Continued)

*Primary Examiner* — Brent T O'Hern
(74) *Attorney, Agent, or Firm* — GrayRobinson, P.A.

(57) ABSTRACT

A traction mat wherein the foam is reinforced with a layer of fabric or fiber between the CLCC foam layer and the substrate or underlying surface. The layering is preferably a first foam layer, a first adhesive layer, a fabric and/or fiber layer, followed by a second adhesive layer. This prevents the CLCC foam from being bonded directly to the substrate which allows the fabric/fiber to support the CLCC foam such that the entire assembly can be removed in one piece without the CLCC foam disintegrating. The introduction of the reinforcing fabric and/or fiber layer eliminates any residual CLCC foam from being bonded to the substrate. Consequently, the traction mat can be easily lifted away and removed.

5 Claims, 7 Drawing Sheets

Related U.S. Application Data

(60) Provisional application No. 62/075,957, filed on Nov. 6, 2014.

(51) Int. Cl.

| | | |
|---|---|---|
| *B32B 7/12* | (2006.01) | |
| *B32B 5/02* | (2006.01) | |
| *B32B 37/12* | (2006.01) | |
| *B32B 37/10* | (2006.01) | |
| *B60N 3/04* | (2006.01) | |
| *B63B 3/48* | (2006.01) | |
| *B32B 5/06* | (2006.01) | |
| *B32B 5/22* | (2006.01) | |
| *B32B 27/12* | (2006.01) | |
| *B32B 27/30* | (2006.01) | |
| *B32B 37/18* | (2006.01) | |
| *B32B 3/06* | (2006.01) | |
| *B32B 3/08* | (2006.01) | |
| *B32B 3/30* | (2006.01) | |
| *B32B 37/02* | (2006.01) | |
| *B32B 38/10* | (2006.01) | |
| *B32B 38/04* | (2006.01) | |

(52) U.S. Cl.
CPC . *B32B 2266/025* (2013.01); *B32B 2266/0207* (2013.01); *B32B 2266/0221* (2013.01); *B32B 2266/08* (2013.01); *B32B 2305/022* (2013.01); *B32B 2305/08* (2013.01); *B32B 2305/188* (2013.01); *B32B 2305/72* (2013.01); *B32B 2307/54* (2013.01); *B32B 2307/5825* (2013.01); *B32B 2307/718* (2013.01); *B32B 2307/732* (2013.01); *B32B 2307/744* (2013.01); *B32B 2307/748* (2013.01); *B32B 2331/04* (2013.01); *B32B 2367/00* (2013.01); *B32B 2405/00* (2013.01); *B32B 2471/04* (2013.01); *B32B 2605/00* (2013.01); *B32B 2605/08* (2013.01); *B32B 2605/12* (2013.01)

(56) References Cited

U.S. PATENT DOCUMENTS

| | | | |
|---|---|---|---|
| 7,416,236 B2 * | 8/2008 | Boddie | B60R 11/00 |
| | | | 296/39.2 |
| 7,503,820 B2 | 3/2009 | Cheung | |
| 9,254,624 B2 * | 2/2016 | Calkins | B32B 5/245 |
| 2004/0121117 A1 | 6/2004 | Peterson | |
| 2004/0202854 A1 * | 10/2004 | Esparza | A47G 27/0212 |
| | | | 428/314.4 |
| 2006/0228537 A1 | 10/2006 | Cheung | |
| 2008/0026197 A1 | 1/2008 | Cheung | |
| 2008/0210366 A1 | 9/2008 | Chen | |
| 2013/0280475 A1 | 10/2013 | Champion | |
| 2014/0069337 A1 | 3/2014 | Dunford | |

* cited by examiner

Tensile strength, tongue tear strength and coefficient of friction of various mat samples under similar conditions

| Sample | Sample description | Tensile strength (average maximum force at break, Direction 1) | Tensile strength (average maximum force at break, Direction 2) | Tongue tear strength (tear in warp direction) | Tongue tear strength (tear in filling direction) | Kinetic coefficient of friction |
|---|---|---|---|---|---|---|
| | | ASTM D5035 | ASTM D5035 | ASTM D2261 | ASTM D2261 | ASTM D1894 |
| A | 6-mm-thick regular CLCC foam (30% EVA) | 44.5 lbs | 44.5 lbs | 3.5 lb-f | 3.1 lb-f | 0.38 |
| B | 6-mm-thick regular CLCC foam (30% EVA), bonded to a 0.2-mm-thick layer of polyester | 178.3 lbs | 285.8 lbs | 27.4 lb-f | 20.3 lb-f | 0.99 |
| C | 6-mm-thick regular CLCC foam (30% EVA), bonded to a 0.2-mm-thick layer of polyester bonded to a 3-mm-thick layer of dimpled cross-linked-closed-cell foam (30% EVA) | 272.5 lbs | 319.3 lbs | 50.4 lb-f | 51.0 lb-f | 1.26 |

NOTE 1: Tensile strength using ASTM D5035 and tongue tear strength using ASTM D2261 are textile industry standards for material strength.
NOTE 2: The coefficient of friction using ASTM D1894 is an accurate indicator for quantifying the ability of a mat to remain attached to the floor of a marine vessel or power sport vehicle without tearing.
NOTE 3: All tests conducted in compliance with ISO/IEC 17025:2005 by Vartest Laboratories Inc., of New York, NY, an ASTM certified and accredited commercial testing facility. Noted ASTM test standards are set forth at http://www.astm.org/Standards/D5035, http://www.astm.org/Standards/D2261 and http://www.astm.org/Standards/D1894

*FIG. 4*

FABRIC REINFORCED TRACTION MAT

CROSS-REFERENCE TO RELATED INVENTIONS

This application is a continuation-in-part of U.S. application Ser. No. 14/863,508 entitled "Removable Foam Traction Mat," filed Sep. 24, 2015, which claims the benefit of the earlier-filed provisional application Ser. No. 62/075,957, filed Nov. 6, 2014, the disclosures of which are hereby incorporated by reference herein.

BACKGROUND OF THE INVENTION

Field of the Invention

This invention relates to a fabric reinforced traction mat made of a layered composite wherein multiple adhesive layers are utilized along with fabric to prevent the foam portion of the mat from sticking to the substrate surface and wherein the traction mat may be snapped or adhered to the substrate surface such as the surfaces of boats, wave runners, snowmobiles, motorcycles, all-terrain vehicles (ATVs) and utility terrain vehicles (UTVs).

Description of the Background Art

Cross-linked-closed-cell foam ("CLCC foam") is a type of foam material that has been used since the 1980s to manufacture traction mats for boats, surfboards, jet skis, boat swim platforms, stand-up paddle boards and other such marine vessels and vehicles. Synthetic polymers are normally used to manufacture CLCC foam, usually by means of polymerization and plastic making technologies that incorporate the addition of foaming agents. Injection molding, foam extrusion, reactive foaming and gelation are some of the known methods for making synthetic polymers, sometimes referred to as "polymeric foams", that are made up of two or more polymers. The term "cross-linked" refers to the chemical bond that binds one polymer chain to another. The term "closed-cell" refers to the fact that the structures of these polymers exhibit enclosed impermeable bubbles, or "cells", unconnected to each other within the foam. Such closed-cell foams are denser than open-cell-structured foams; they do not have interconnected pores and they normally exhibit higher compressive strength due to such structures. Eva-Glory Industrial Co., of Taiwan, and the Ultralon Foam Group, of New Zealand, are just two of many commercial suppliers of CLCC foams. "Polymeric foam", "cross-linked polyethylene foam" and "EVA foam" are among the terms that are used in commerce to refer to these CLCC foams. The term "EVA foam" refers to the fact that, initially, many of these foam products were made from ethylene vinyl acetate (EVA) and the term continued to be used commercially even when many of the newly developed foams contained very little or even no ethylene vinyl acetate at all. In the context of this patent disclosure it will be understood that the term "CLCC foam" refers to cross-linked-closed-cell foam, as well as "EVA foam", whether or not the EVA foam contains little or no ethylene vinyl acetate at all.

CLCC foam is usually attached to the surfaces of such marine vessels or power sport vehicles by pasting a glue on the undersurface of the CLCC foam or on the surfaces for which increase traction is needed on such marine vessels or power sport vehicles, like, for example, the foot wells of a jet ski or the swim platform of a boat or the surface of a stand-up paddle board. As would be expected, such surfaces are usually wet and the people using such boats, surfboards, jet skis, platforms and other such marine vessels or power sport vehicles are often barefoot, making strong traction a most important safety feature of those vessels and vehicles.

The prior practice in this field has been to use glue to stick or adhere the CLCC foam to a substrate, which is usually fiberglass. It is done this way because the CLCC foam is spongy and cannot hold a shape and will tear if not stuck to a strong surface. Gluing the CLCC foam down in this fashion makes it permanent. This means the user cannot remove the CLCC foam (e.g., for cleaning) on occasions and then re-install it. Furthermore, the CLCC foam has a limited life and must be replaced every few years or, in some cases, every few months. The process of removing and replacing the old CLCC foam is tedious and scares away many users. This has been a problem in the marine industry where suppliers of CLCC foam traction mats often try to sell boat builders on gluing CLCC foam in the interior of the boat (in addition to the swim platform).

A number of compositions and techniques based on or related to CLCC foam have been used in the past for various purposes and with different results. For example, U.S. Pat. No. 6,258,862, of Matz at al., the disclosure of which is hereby incorporated by reference herein, covers a specific composition for applications in the manufacturing of foam sheets used in the motor vehicle industry. The patented composition includes polyolefin, propylene polymer and EVA. PVC is essentially described as undesirable for the patented composition.

U.S. Pat. No. 7,503,820, to Cheung, the disclosure of which is hereby incorporated by reference herein, addresses a rigid, multi-layered, laminated recreational sports board, for riding waves and the like, comprised of a polymer film layer, a polyethylene foam layer and an extruded adhesive resin layer. A copolymer of EVA is mentioned as an example of the stipulated polyethylene foam layer. Anhydrite-modified EVA is mentioned as one of the kinds of adhesive resin layers that may be used. The layers are bonded to each other; and several combinations of layers and suggested compounds are discussed for carrying out lamination techniques.

U.S. Pat. Publication No. 20060228537, of Cheung, and U.S. Pat. Publication No. 20080026197, also of Cheung, the disclosures of which is hereby incorporated by reference herein, disclose a rigid multi-layered foam composite glider that may be used as a body board, a snow slide or the like, as well as a method for improving the surface smoothness of a polyolefin film on a polyethylene foam core glider. The composition of the glider includes EVA foam and a polymer film layer. The method uses extrusion to form the laminated glider structure.

U.S. Pat. Publication No. 20080210366, of Chen, the disclosure of which is hereby incorporated by reference herein, discloses a method for manufacturing mats that are said to be light in weight, flexible and slippery-proof. Automobile mats, bathroom mats, Yoga mats, household door mats and sidewalk mats are contemplated. The particular method claimed involves the use of an extruder, rollers, a knurling wheel, a discharge tank and so forth. EVA foam, polyethylene, polypropylene, polyolefin foam and other polymer substances are used.

U.S. Pat. Publication No. 20130280475, of Champion, the disclosure of which is hereby incorporated by reference herein, describes a multi-layered marine vessel cushion pad for marine applications that uses EVA and is said to be removable and provide good traction. The pad is sometimes referred to as the "deck cover" or as the "assembly". The patent application claims the assembly structure as well as a method for making it. Three layers are preferred. The deck of a marine vessel is the surface to which the pad may be fastened and from where it may be easily removed. Champion's objective is providing good cushioning to reduce shock and impact on humans and equipment on board, not providing strength to the EVA foam assembly to allow it to be fastened to the marine deck without tearing. The means for attaching the assembly to the marine deck comprises hook-or-eye fasteners such as Velcro®.

U.S. Pat. Publication No. 20140069337, of Dunford, the disclosure of which is hereby incorporated by reference herein, claims an improved dog mat made of cross-linked, closed-cell polyolefin elastomeric or EVA foam with a continuous thin, waterproof soft outer skin that is said to be tear resistant. An odor repellant may be added to the mat.

Several other compositions and techniques have also been used in the past for certain marine applications for various purposes and with different results. Among them. U.S. Pat. Publication No. 2004/0121,117, of Peterson, the disclosure of which is hereby incorporated by reference herein, describes a marine vessel outdoor carpet that is made of foam and that is said to be removable and detachable by providing it with snap heads and sockets mounted in and spaced along the unpadded carpet border to be snapped directly to the snap studs mounted on the deck surface. The main novel feature claimed by Peterson is that his carpets are cushioned to provide foot comfort to the standing helmsman on the vessel. The foam cushion padding is adhered to the underside of the carpet.

A need exists for a fabric reinforced traction mat that does not have to be glued to the surface of a vessel and that is strong enough to have snaps installed allowing easy removal. In a first embodiment, with snaps installed in the traction mats, the fabric reinforced traction mat can be snapped in place and then removed as necessary; and there is no need to glue down the CLCC foam. Alternatively, in a second embodiment, fabric reinforcement and layering in the fabric reinforced traction mat allows for the traction mat to be glued down while still allowing easy removal. The known prior art does not allow for snaps because conventional CLCC foam is too soft and the snaps get pulled out of the foam too easily. Also, the CLCC foam is too soft and tears easily making removal difficult.

Therefore, it is an object of this invention to provide an improvement which overcomes the aforementioned inadequacies of the prior art devices and provides an improvement which is a significant contribution to the advancement of the traction mat art.

Another object of this invention is to provide a first embodiment of a reinforced CLCC foam traction mat product with snaps, incorporated into the traction mat structure, which allow the traction mat to be snapped in place and then removed as necessary.

Another object of this invention is to provide a second embodiment of a reinforced CLCC foam traction mat having a separate layer between the CLCC foam layer and the substrate allowing the traction mat to be glued to the surface of a vessel if there was, thereby allowing the fabric reinforced traction mat to be removed at will and prevents the fabric reinforced traction mat from breaking apart on removal due to baking in the sun or other factors.

Another object of this invention is to provide a fabric reinforced traction mat product with improved strength that allows the use of snaps to easily and conveniently attach and detach the fabric reinforced traction mat to and from marine surfaces, such as the surfaces of boats and other marine vessels, as well as to and from the surfaces of snowmobiles, ATVs, UTVs and other such power sport vehicles.

Another of this invention is to provide a fabric reinforced traction mat having a multi-layered structure specifically designed for such surface applications into which snaps may be incorporated in order to make a truly removable traction mat without the limitations associated with some of the traction mats currently available from other sources.

Another object of this invention is to provide a fabric reinforced traction mat for such marine and power sport applications that makes use of a unique multi-layered structure that increases its tensile strength and which allows the traction mat to be attached and removed by means of snaps without constantly tearing off the snaps when attaching or removing them.

Another object of this invention is to provide a fabric reinforced traction mat for marine and power sport applications that comprises a combination of a unique multi-layered structure with snaps, incorporated into said multi-layered structure, that has excellent traction (non-skid) properties and that is truly attachable and removable my means of snaps that do not separate from the traction mat when attaching or removing them.

Another object of this invention is to provide a fabric reinforced traction mat that is flexible and easy to roll and therefore offer an added competitive advantage when being shipped and/or handled.

Another object of this invention is to provide a fabric reinforced traction mat with the aforementioned attributes which may be manufactured and assembled by means of conventional techniques such as extrusion, laminating and rolling.

Another object of this invention is to provide a fabric reinforced traction mat having multiple layers of adhesive and fabric reinforcement such that a user can easily and quickly lift and replace the traction mat.

Another object of this invention is to provide a fabric reinforced traction mat comprising a fabric reinforcement layer that provides tensile strength and which can be adhered to a substrate or underlying surface.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

There remains a need to provide a further improved fabric reinforced traction mat which is layered with adhesive and fabric reinforcement which allows for easier removal from a substrate.

The fabric reinforced traction mat of the present invention comprises in a first embodiment: (a) one or more layers of CLCC foam; (b) one or more layers of a synthetic woven textile fiber; (c) one or more layers of a dimpled CLCC foam, or equivalent non-skid base material; and (d) a plurality of snaps, imbedded or otherwise incorporated into the fabric reinforced traction mat product so as to allow the fabric reinforced traction mat product to be clasped and fastened to the desired surface of the marine vessel or power sport vehicle. Techniques for forming and assembling the fabric reinforced traction mat include adhesion, laminating and rolling. The CLCC foam product of this invention has a layer of a strong synthetic woven textile fiber applied to the CLCC foam. The synthetic woven textile fiber provides the additional strength needed for snaps to be incorporated into the CLCC foam and for the resulting multi-layered CLCC foam to be strong enough to stand alone and not tear without being glued to a rigid substrate such as the floor of a boat or an ATV. The amount of commercial CLCC foam used is between about 30% and 90% of the weight of the formed multi-layered structure assembly. Examples of other CLCC foams suitable for making the multi-layered structure include ethylene vinyl acetate foam, ethylene-olefin interpolymers foam, olefin block copolymers foam, polyolefin foam and cross-linked polyethylene foam. These foams are commercially available, often under trade names such as Infuse™ (Dow Chemical, http://www.dow.com/elastomers/products/infuse.htm), Engage™ (Dow Chemical, http://www.dow.com/elastomers/products/engage.htm), Plastazote® foam (Kewell-Converters, http://www.kewell-converters.com.uk/materials/plastazote-foam), Supazote® foam (Kewell-Converters, http://www.kewell-converters.co.uk/materials/supazote-foam), Isolon EPE™ (Izhevsk Plastics Plant, http://www.ipp.ru/en/products/isolon/) and Isolon EVA™ (Izhevsk Plastics Plant, http://www.ipp.ru/en/products/isolon/). The CLCC foams may be used individually or blended with each other in making the multi-layered structure.

A second embodiment of the present invention is a reinforcement of the CLCC foam with a layer of fabric or fiber between the CLCC foam layer and the substrate or underlying surface. The layering is preferably a first foam layer, a first adhesive layer, a fabric and/or fiber layer, followed by a second adhesive layer. This prevents the CLCC foam from being bonded directly to the substrate. The fabric/fiber supports the CLCC foam such that the entire assembly can be removed in one piece without the CLCC foam disintegrating. Removal time is reduced to less than 3 minutes per square foot. The introduction of the reinforcing fabric and/or fiber layer eliminates any residual CLCC foam from being bonded to the substrate. Consequently, the fabric reinforced traction mat can be lifted away in one piece.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings. The drawings suffixed with the letter "A" refer to the first embodiment of the parent application. The drawings suffixed with the letter "B" refer to the second embodiment employing the multiple adhesive layers and fabric reinforcement.

FIG. 4 shows a tabulation of results obtained from tests conducted in order to compare critical properties affecting the ability of the fabric reinforced traction mat of the invention (Sample C) to remain attached to the surface of a vessel or vehicle as compared to prior art mats (Samples A and B).

Similar reference characters refer to similar parts throughout the several views of the drawings.

DETAILED DESCRIPTION OF THE PREFERRED EMBODIMENT

Figure 1A:
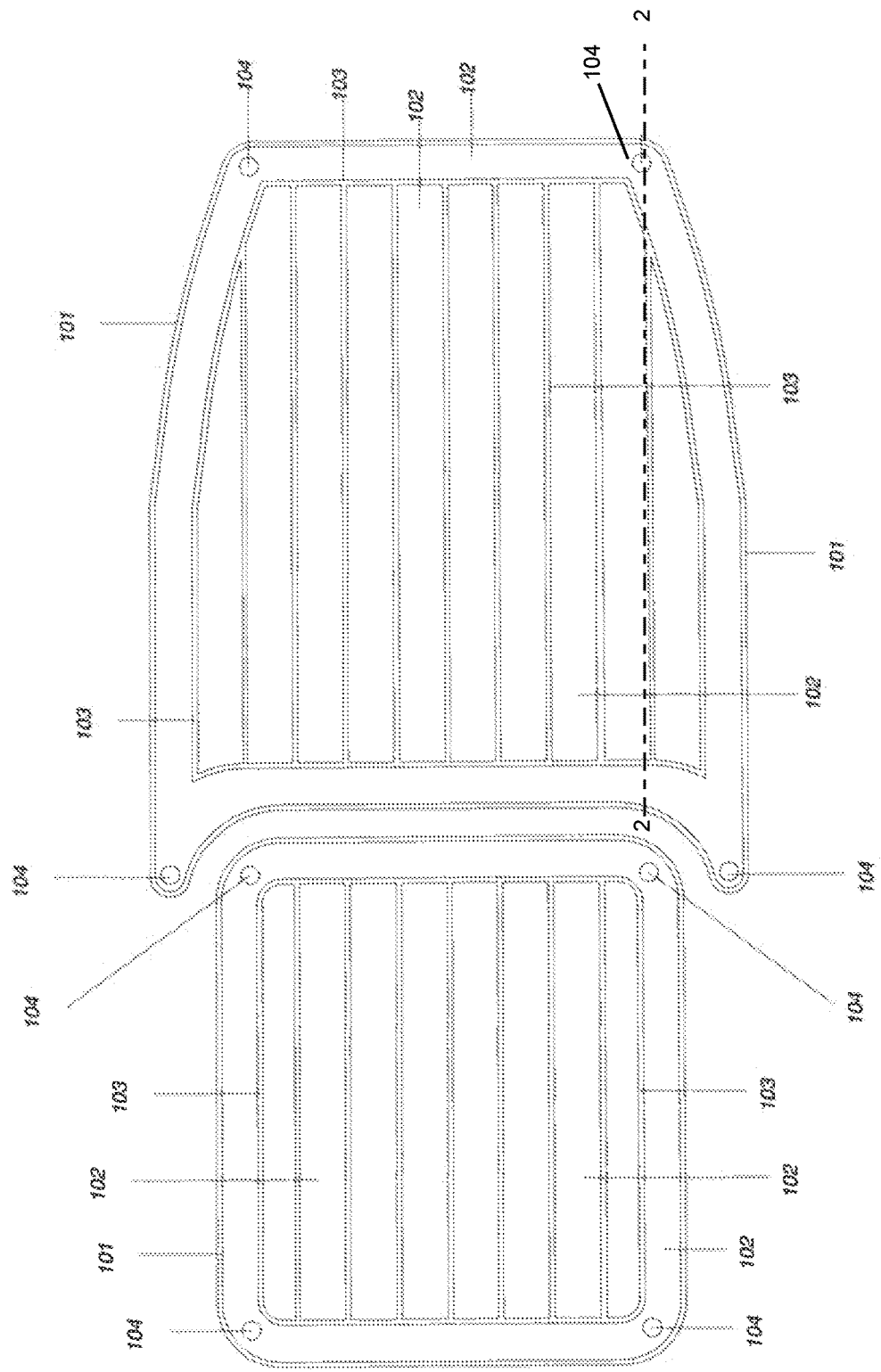
FIG. 1A is an illustration of the fabric reinforced traction mat of the first embodiment of the invention showing its components.
Figure 1B:
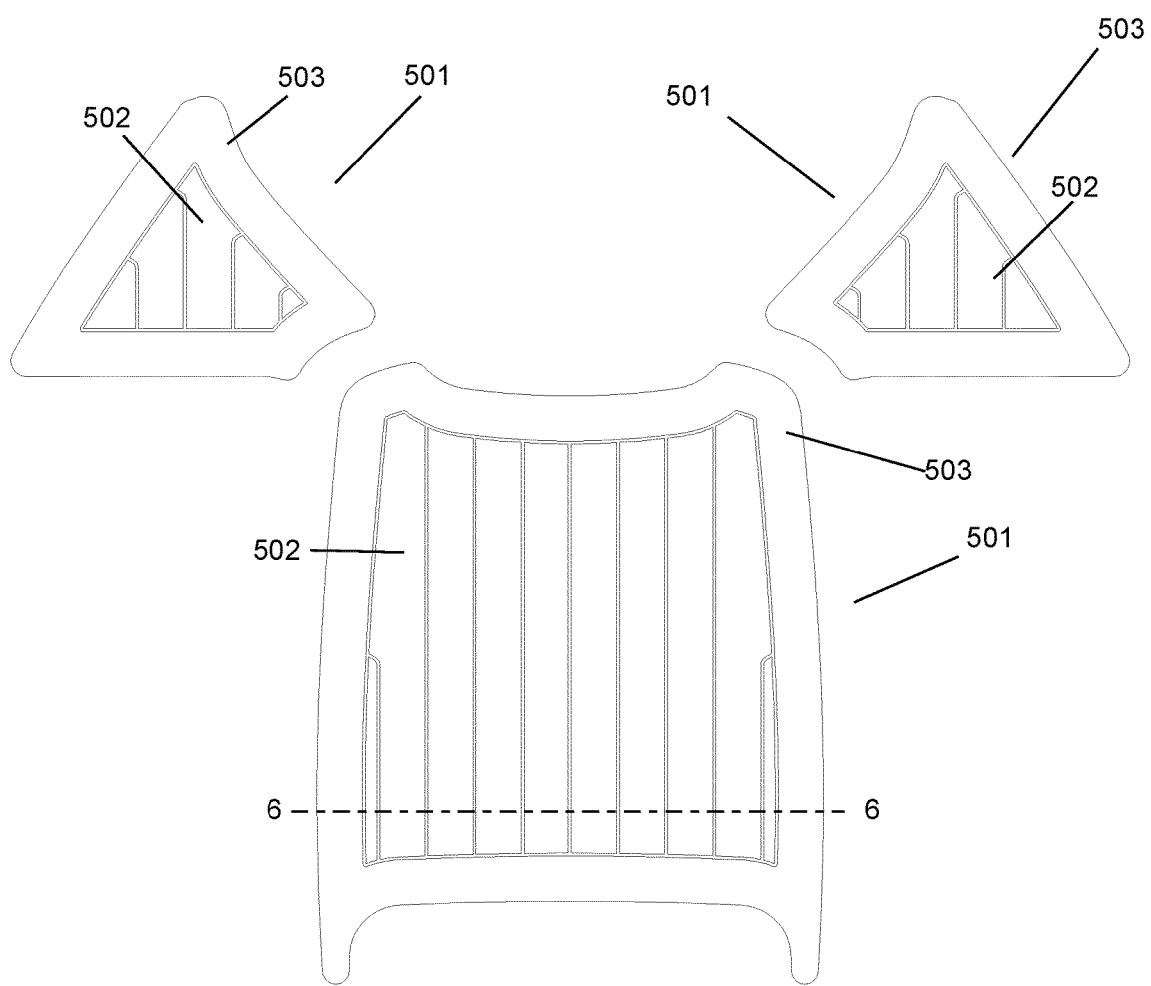
FIG. 1B is a top plan view of three exemplary configurations of fabric reinforced traction mats of the second embodiment of the invention.

FIG. 1 shows exemplary top views of fabric reinforced traction mats as laid on the surface of a vessel or vehicle such as a boat. FIG. 1A is directed to the first embodiment and FIG. 1B is directed to the second embodiment. It shall be understood however that the particular size and shape of the fabric reinforced traction mat(s) are dependent on the layout of the walkways of the vessel or vehicle and the personal preferences of the user. Therefore, without departing from the spirit and scope of the present invention, the fabric reinforced traction mat may comprise any size and shape as may be desired or appropriate for a particular vessel or vehicle.

Referring to each fabric reinforced traction mat 101 in FIG. 1A, upper outer surface 102 is made of CLCC foam that has been bonded to a second layer of CLCC foam 103, which is in turn bonded to a strong synthetic woven textile fiber (not seen in the top view), which is in turn bonded to the lower outer surface of the traction mat (not seen in the top view) and made of dimpled CLCC foam. Round metal snaps 104 have been imbedded through the three layers of CLCC foam, synthetic woven textile fiber and dimpled cross-linked-closed-cell foam by riveting.

In the second embodiment shown in FIG. 1B, a top view of two removable CLCC foam traction mats as laid on the surface of a boat in one typical fashion contemplated by the invention is provided. The two traction mats have been cut and sized to conveniently fit a particular area of the boat. The fabric reinforced traction mats can also be cut and sized in many other shapes and sizes to suit other types and sizes of areas to be covered on boats and other marine vessels and/or power sport vehicles. Referring to each fabric reinforced traction mat 501 in FIG. 1B, upper outer surface 502 is made of CLCC foam that has been bonded to a second layer of CLCC foam 503, which is in turn bonded to a first adhesive layer (not seen in the top view), which is in turn bonded to a strong synthetic woven textile fiber (not seen in the top view), which is in turn bonded to a second adhesive layer (not seen in the top view). The second layer of CLCC foam 503 is made of cross-linked-closed-cell foam.

Figure 2A:
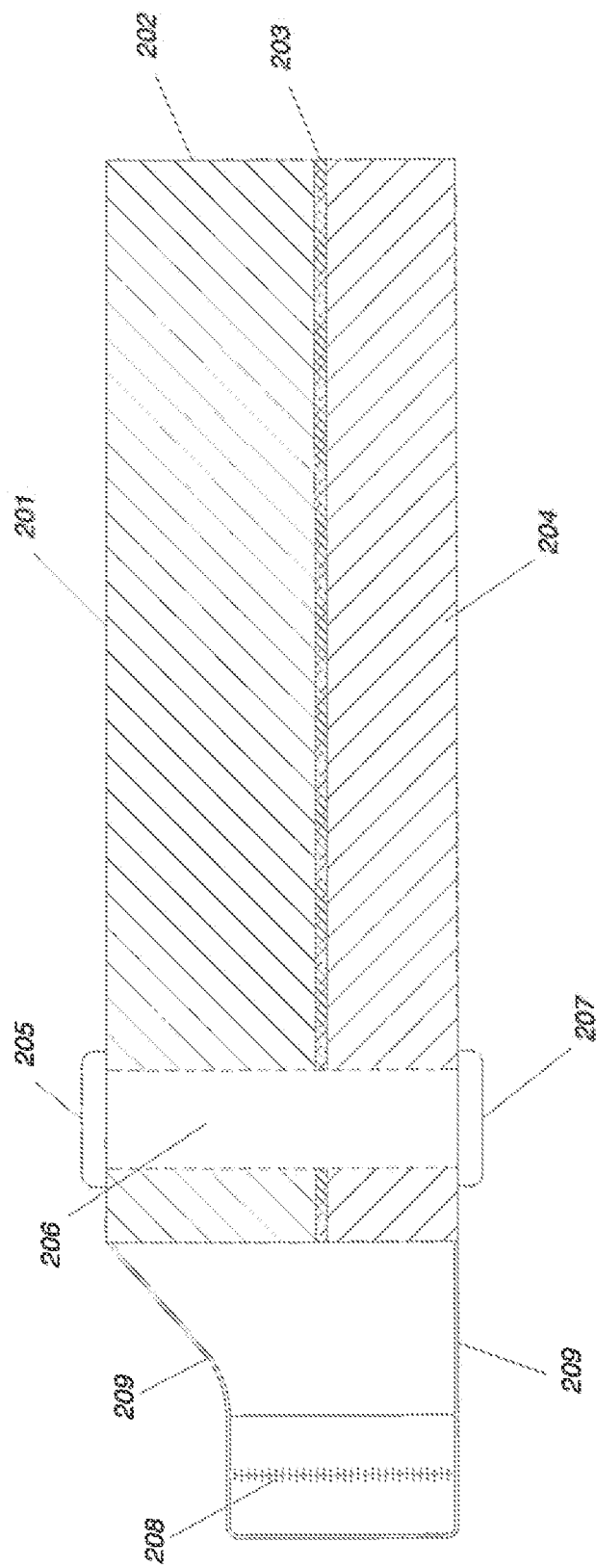
FIG. 2A is a side cross-sectional view of the fabric reinforced traction mat of the invention along lines 2-2 of FIG. 1A.

FIG. 2A is a cross-sectional view of a first embodiment of the fabric reinforced traction mat along line 2-2 showing the multi-layered structure of the CLCC foam, strong synthetic woven textile fiber and dimpled CLCC foam to which the stipulated snaps of the invention have been incorporated by riveting. Accordingly, referring to FIG. 2A, fabric reinforced traction mat 201 is comprised of a 6-millimeter-thick upper outer surface layer of CLCC foam 202 that has been bonded or is otherwise communicably attached to a 0.2-millimeter-thick middle inner surface layer of strong synthetic woven textile fiber 203. Middle inner surface layer 203 is bonded to a 3.0-millimeter-thick lower outer surface layer of dimpled CLCC foam 204. Dimpled CLCC foam may be made by feeding a smooth sheet of CLCC foam into embossing rollers programmed to impart a desired dimple profile on the CLCC foam. Embossing rollers often make use of hot oil to provide heat to the CLCC foam that is being embossed. The smooth-surface CLCC foam is fed into the hot rollers at room temperature and comes out hot and embossed with dimples. After a brief cool-down period the dimpled CLCC foam is ready for use in making the multi-layered structure of the invention. Other techniques may be used for embossing the CLCC foam and making dimpled cross-linked-closed-cell foam. A preferred dimpled CLCC foam for use in making the multi-layered structure of the invention will have anywhere between about 1,000 and 10,000 dimples per square foot of surface. The layer of dimpled cross-linked-closed-cell foam not only provides the desirable non-skid properties but allows the bottom of the multi-layered structure to "breath" better, allowing the circulation of air and a concomitant reduction of moisture in the structure. With a reduction in moisture comes a reduction in the amount of mold that tends to form as a result of moisture accumulation. The overall result is a multi-layered structure 201 that is not only stronger enough to have snaps installed in it but a truly removable fabric reinforced traction mat with improved non-skid attributes that stays in place and can be attached and detached when necessary or desirable.

The head 205 of round metal snap 206 sits snuggly on top of upper outer surface layer of CLCC foam 202. Round metal snap 206 has been riveted to and penetrates the three layers 202, 203 and 204 ending in cap or snap bottom 207 which takes the shape of a round clasp suitable for and adaptable to receive the stud or head of a corresponding mating snap (not shown) on the surface of a boat or other vessel or vehicle. The snaps are preferably riveted to the multi-layered structure 201 using a hand arbor press but may be riveted using any appropriate machinery.

The thicknesses of the three layers described above are illustrative of preferred thicknesses for the particular embodiment shown in FIG. 2A. Similar and various other thicknesses may be used to suit different applications. For most applications a thickness of between about 3 millimeters and 10 millimeters is preferred for the upper layer of CLCC foam; a thickness of between about 0.1 millimeters and 0.5 millimeters is preferred for the middle layer of strong synthetic woven textile fiber; and a thickness of between about 3 millimeters and 6 millimeters is preferred for the lower layer of dimpled cross-linked-closed-cell foam. In completing the fabrication of the fabric reinforced traction mat, it is often convenient to mechanically bind its perimeter to minimize any tendency of the layers that comprise the multi-layered structure 201 to separate and to provide a certain degree of finishing to the final product. When this is done the preferred means for mechanically binding the perimeter is stitching 208. A binding 209 may also be added around the perimeter, for example, by stitching, to also minimize any tendency of the layers to separate and to provide a certain degree of finishing to the final product. The preferred material for binding is a polyester fabric. Beveling a portion of the perimeter may also be convenient when sewing around it and/or binding it.

The preferred synthetic woven textile fiber is polyester. Examples of other strong synthetic woven textile fibers that may be used include acetate, acrylic, Kevlar, latex, nylon, rayon and spandex. The amount of synthetic woven textile fiber used is between about 2% and 50% of the weight of the formed multi-layered structure assembly. Synthetic woven textile fibers are textiles manufactured from man-made rather than natural fibers, and are often referred to as "woven synthetic fabrics" or simply "synthetic fabrics". They are usually made by joining monomers into polymers by the process of polymerization using chemicals derived from coal, oil and/or natural gas to make threads that are then woven together to make the fabrics.

A layer of dimpled CLCC foam or equivalent non-skid base material is applied to the fiber reinforcement on the undersurface of the CLCC foam. The dimpled CLCC foam or equivalent non-skid base material should have a high coefficient of friction and be textured so as to provide good anti-skid properties to the multi-layered structure and the traction mat product. The amount of dimpled CLCC foam or equivalent non-skid base material should be between about 30% and 70% of the weight of the formed multi-layered structure assembly. Materials that have high coefficients of friction and thus are able to impart nonskid properties to the multilayered structure also include rubber, cork, abrasive grit and polyvinyl chloride, commonly referred to as "PVC".

The combination of the top layer of CLCC foam, the strong synthetic woven textile fiber and the dimpled CLCC foam or equivalent non-skid base material comprises a multi-layered structure to which a number of snaps are then integrated by riveting or other conventional techniques. The snaps are preferably round metallic snaps, but they also may be made of plastic or other materials and have square or other shapes. Four or six snaps are usually sufficient to secure relative small or medium size traction mats to the desired surfaces of the vessels or vehicles, but more or less snaps may be used depending on the size of the traction mats and the surfaces to be covered by them.

Figure 2B:
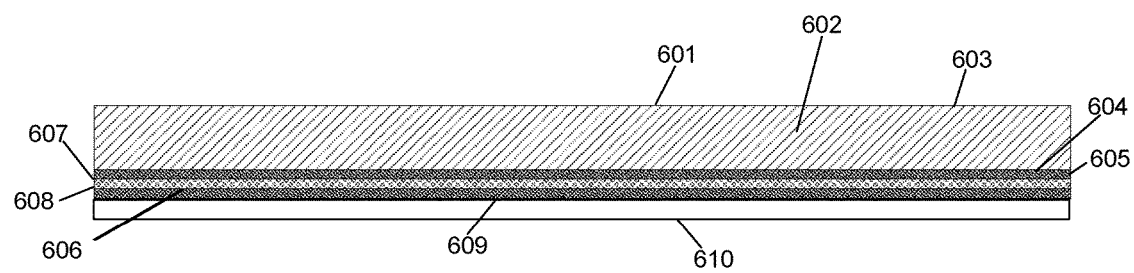
FIG. 2B is a partial cross-sectional view of the second embodiment of the fabric reinforced traction mat of the invention along lines 6-6 of FIG. 1B showing the CLCC foam, first adhesive layer, strong synthetic woven textile fabric/fiber, second adhesive layer, and substrate.

FIG. 2B provides a second embodiment of the invention, showing a side view of the fabric reinforced traction mat with a multi-layered structure of CLCC foam, strong synthetic woven textile fiber and adhesive layers. Accordingly, referring to FIG. 2B, the fabric reinforced traction mat 601 is comprised of an at least 2-millimeter-thick upper outer surface layer of CLCC foam 602 having an upper surface 603 and lower surface 604 that has been bonded to an at least 0.127-millimeter-thick first adhesive layer 605. The first adhesive layer 605 is bonded or is otherwise communicably attached to an at least 0.2-millimeter-thick middle inner surface layer 606 of strong synthetic woven textile fiber having an upper fabric face 607 and lower fabric face 608 wherein the first adhesive layer 605 is communicably attached with the upper fabric face 607. This communicable attachment can either be through the use of adhesives, hook and loop connections, or other similar types of connections. The lower fabric face 608 of the middle inner surface layer 606 is further bonded to an at least 0.127-millimeter-thick second adhesive layer 609 which in communicable contact with a substrate 610. CLCC foam may be made by feeding a smooth sheet of CLCC foam into embossing rollers programmed to impart a desired profile on the CLCC foam. Embossing rollers often make use of hot oil to provide heat to the CLCC foam that is being embossed. The smooth-surface CLCC foam is fed into the hot rollers at room temperature and comes out hot. After a brief cool-down period the foam is ready for use in making the multi-layered structure of the invention. Other techniques may be used for embossing the CLCC foam and making CLCC foam. The layer of CLCC foam not only provides the desirable non-skid properties but allows the bottom of the multi-layered structure to "breathe" better, allowing the circulation of air and a concomitant reduction of moisture in the structure. With a reduction in moisture comes a reduction in the amount of mold that tends to form as a result of moisture accumulation. The overall result is a multi-layered structure that is a truly removable traction mat with improved non-skid attributes that stays in place and can be attached and detached when necessary or desirable. The second adhesive layer 609 is attached to the substrate 610 which can be any underlying surface but it preferably the floor of a marine vessel. "Attached" means fastened in such a manner that the traction mat will not skid or move when pressure is applied but can still be easily removed.

The thicknesses of the three layers described above are illustrative of preferred thicknesses for the particular embodiment shown in FIG. 2B. Similar and various other thicknesses may be used to suit different applications. For most applications, a thickness of between about 2 millimeters and 15 millimeters is preferred for the upper layer of CLCC foam; a thickness of between about 0.1 millimeters and 1.0 millimeters is preferred for the middle layer of strong synthetic woven textile fiber; and a thickness of between 0.05 millimeters and 2 millimeters is preferred for each adhesive layer.

Figure 3A:
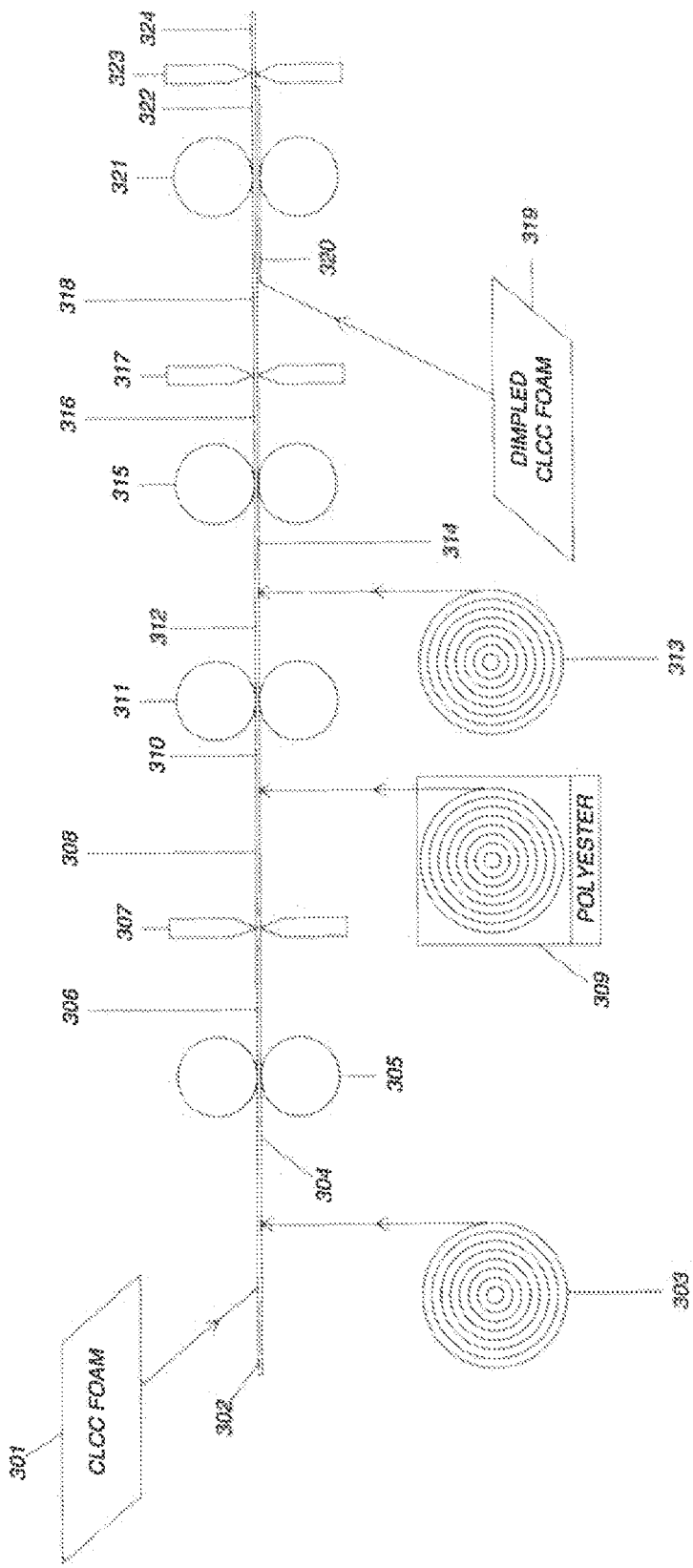
FIG. 3A shows a process flow diagram for assembling the multi-layered structure of the fabric reinforced traction mat of the first embodiment.

FIG. 3A is a process flow diagram of for the first embodiment showing the assembly of the fabric reinforced traction mat having a multi-layered structure of CLCC foam, synthetic woven textile fiber and dimpled cross-linked-closed-cell foam of the invention. Thus, referring to FIG. 3A, 6-millimeter-thick layer of CLCC foam sheet 301, having an ethylene vinyl acetate content of 30%, is fed to assembly line 302 where it contacts double-side pressure-sensitive adhesive ("PSA") tape 303, applied to its lower surface, and it is than directed, as first sheet 304, to a first set of rolling pinch presses 305 to secure good adhesion of PSA tape 303 to its lower surface. Coming out of the rolling pinch presses 305, first knife 307 is used to slit the layers of second sheet 306 and remove excess material. Third sheet 308 is then contacted with 0.2-mm-thick layer of polyester 309 (or other similar material), applied to its lower surface by adhering it to the other side of PSA tape 303. Fourth sheet 310 is then directed to a second set of rolling pinch presses 311 to secure good adhesion, laminate them and provide strong bonding between the layer of the CLCC foam and the polyester. Subsequently, the bonded and laminated layers 312 of CLCC foam and polyester are contacted with double-side PSA tape 313, applied to their lower surface and directed, as fifth sheet 314, to rolling pinch presses 31 to secure good adhesion of PSA tape 313 to their lower surface. Coming out of a third set of rolling pinch presses 315, second knife 317 is used to slit the layers of sixth sheet 316 and remove excess material. Seventh sheet 318 is then contacted with the assembly line with 3-mm-thick layer of dimpled cross-linked-closed-cell foam 319, having an ethylene vinyl acetate content of 30%. The layer of dimpled CLCC foam 319 is applied to the lower surface of seventh sheet 318 by adhering it to the other side of PSA tape 313. Eighth sheet 320 is then directed to a fourth set of rolling pinch presses 321 to secure good adhesion, laminate them and provide strong bonding between the layer of polyester and the layer of dimpled CLCC foam. Third knife 323 is used to slit the layers of well-bonded sheet 322 and remove excess material. The final sheet 324, which is made up of well-bonded layers of CLCC foam, polyester and dimpled CLCC foam, constitutes a good example of the multi-layered structure of the invention.

The snaps 104 of the first embodiment are preferably incorporated into the bonded multi-layered structure 324 by riveting as already described above. A hand arbor press is used to crimp together the two parts of each snap. The number and placement of the snaps will be dictated by the size and dimensions of the sheet of bonded multi-layered structure used for assembling the various removable traction mats. As an illustration, four snaps placed approximately on the four corners of a four-foot-by-four-foot bonded multi-layered structure will usually suffice in most cases for a medium-size boat surface. The snaps may also be incorporated into the multi-layered structure at specific locations to match the locations of corresponding mating studs that have been installed on the surface of a vessel or vehicle by the manufacturer of such vessel or vehicle.

Figure 3B:
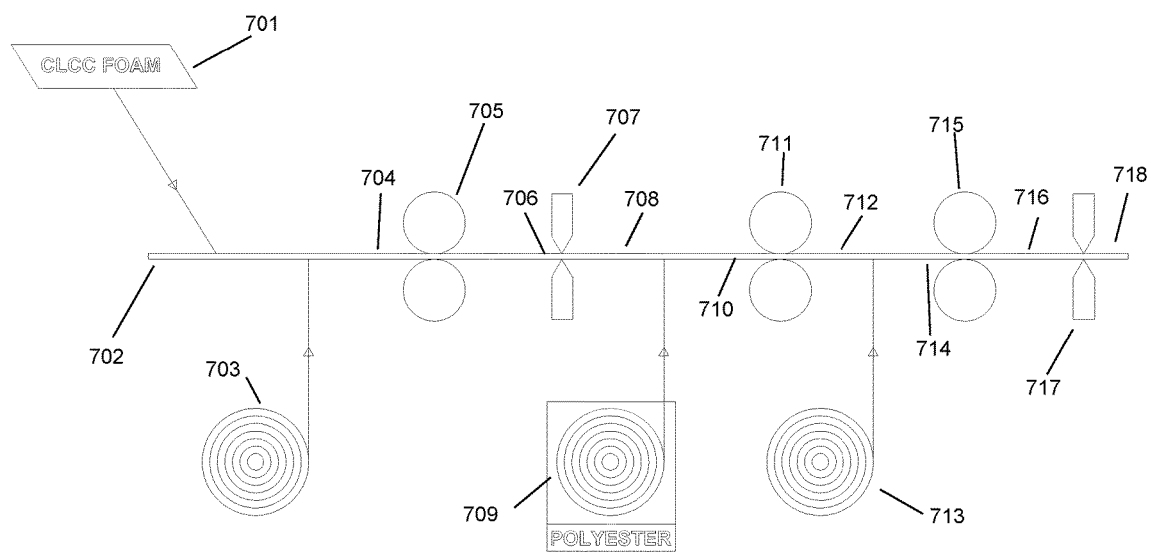
FIG. 3B shows a process flow diagram for assembling the second embodiment of the fabric reinforced traction mat of the second embodiment.

Referring to FIG. 3B, showing the process flow diagram for the second embodiment, CLCC foam sheet 701, having an ethylene vinyl acetate content of 30%, is fed to assembly line 702 where it contacts double-side pressure-sensitive adhesive ("PSA") tape 703, applied to its lower surface, and it is than directed, as first sheet 704, to a first set of rolling pinch presses 705 to secure good adhesion of first adhesive 703 to its lower surface 604. First adhesive 703 may be any adhesive which bonds to CLCC foam. Coming out of the rolling pinch presses 705, first knife 707 is used to slit the layers of second sheet 706 and remove excess material. Resulting sheet 708 is then contacted with an at least 0.2-mm-thick layer of polyester 709 or other fabric or fiber of similar tensile strength and properties, applied to its lower surface by adhering it to the other side of first adhesive 703. Third sheet 710 is then directed to a second set of rolling pinch presses 711 to secure good adhesion, laminate them and provide strong bonding between the layer of the CLCC foam and the polyester. Subsequently, the bonded and laminated layers 712 of CLCC foam and polyester are contacted with a second adhesive layer 713, applied to the lower fabric face 608 and directed, as fourth sheet 714, to a third set of rolling pinch presses 715 to secure good adhesion of second adhesive 713 to the lower fabric face 608. Second adhesive 713 may be any adhesive which bonds to fabrics such as polyester. Coming out of the third set of rolling pinch presses 715, second knife 717 is used to slit the layers of fifth sheet 716 and remove excess material. Final sheet 718 is made up of well-bonded layers of CLCC foam, polyester or similar fabric/fiber, and multiple layers of adhesive and constitutes a good example of the multi-layered structure of the invention.

Tests were conducted by an ASTM-certified and accredited commercial testing facility in order to compare critical properties affecting the ability of a traction mat to remain attached to the floor of a typical marine vessel or power sport vehicle. Different assemblies of layers of different materials, including the assembly of layers used in the removable traction mat of the invention, were subjected to various tensile and elongation forces under similar conditions. FIG. 4 shows the results obtained from these tests.

As shown in FIG. 4, Sample A was a 6-millimeter-thick regular layer of CLCC foam having an ethylene vinyl acetate content of 30%. Sample A was subjected to increasing tensile forces and to increasing tongue tear forces by conventional ASTM procedures at the testing facility of Veriest Laboratories in New York. The average maximum force at which Sample A sustained a break, i.e., its tensile strength, was 44.5 lbs (pounds) in direction 1 and 44.5 lbs (pounds) in direction 2. The average tongue-tear strength (tear in warp direction) of Sample A was determined to be 3.5 lb-f (pound foot), whereas its average tongue-tear strength (tear in filling direction) was 3.1 lb-f (pound foot). The kinetic coefficient of friction of Sample A was 0.38.

Sample B was a 6-millimeter-thick regular layer of CLCC foam, also having an ethylene vinyl acetate content of 30%, that was bonded to a 0.2-mm-thick-layer of polyester fabric at the bottom, i.e., at its lower surface. Sample B was subjected to increasing tensile forces and to increasing tongue tear forces by the same conventional ASTM procedures as Sample A at the testing facility of Vartest Laboratories. The average maximum force at which Sample B sustained a break, i.e., its tensile strength, was 178.3 lbs in direction 1 and 285.8 lbs in direction 2. The average tongue-tear strength (tear in warp direction) of Sample B was determined to be 27.4 lb-f, whereas its average tongue-tear strength (tear in filling direction) was 20.3 lb-f. The kinetic coefficient of friction of Sample B was 0.99.

Sample C was a 6-millimeter-thick regular layer of CLCC foam, also having an ethylene vinyl acetate content of 30%, that was also bonded to a 0.2-mm-thick-layer of polyester fabric at the bottom. The 0.2-mm-thick-layer of polyester fabric at the bottom was in turn bonded at its lower surface to a 3-mm-thick layer of dimpled cross-linked-closed-cell foam that also had an ethylene vinyl acetate content of 30%, Sample C was a typical example of the multi-layered structure of the invention. This sample was subjected to increasing tensile forces and to increasing tongue tear forces by the same conventional ASTM procedures as Samples A and B at the Vartest testing facility. As shown in FIG. 4, the average maximum force at which Sample C sustained a break, i.e., its tensile strength, was 272.5 lbs in direction 1 and 319.3 lbs in direction 2. The average tongue-tear strength (tear in warp direction) of Sample C was determined to be 50.4 lb-f, whereas its average tongue-tear strength (tear in filling direction) was 51.0 lb-f. The kinetic coefficient of friction of Sample C was 1.26.

The results of the tests tabulated in FIG. 4 clearly show that the unique multi-layered structure provided by the system of the invention (Sample C) has superior and improved strength that allows metal snaps and other similar types of snaps to be incorporated into it and used to attach the traction mat to the surfaces of boats, ATVs and other marine vessel and power sport vehicles. Furthermore, these results also show that the multi-layered structure of Sample C also has a substantially higher kinetic coefficient of friction than those of the layered structures of Samples A and B, thus allowing the traction mat of the invention to remain attached to said surfaces. The result is a unique and superior combination of components that yield improved and superior results and provide a truly superior removable foam traction mat for these applications.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A removable fiber-reinforced traction mat comprising a formed composite capable of adhering to a surface, said composite further comprising:
   (a) a layer of cross-linked-closed-cell foam having an upper surface and a lower surface, said layer of cross-linked-closed-cell foam having a thickness between about 2 and 15 millimeters and constituting between about 30% and 90% by weight of said composite;
   (b) a first adhesive layer comprising a first adhesive bonded to said lower surface, said first adhesive layer having a thickness between about 0.05 and 0.5 millimeters;
   (c) a layer of a synthetic woven textile fiber having a tensile strength of at least 2.8 lbs maximum force at break (direction 1) and 2.5 lbs maximum force at break (direction 2) and a tongue tear strength of at least 1.0 lb-f (tear in warp direction) and 1.0 lb-f (tear in filling direction) and further having an upper fabric face and lower fabric face, said layer of synthetic woven textile fiber having a thickness between 0.1 and 1.0 millimeters and said upper fabric face of said layer of synthetic woven textile fiber bonded to said first adhesive layer; and
   (d) a second adhesive layer comprising a second adhesive bonded to said lower fabric face, said second adhesive layer having a thickness between about 0.1 and 1.0 millimeters, thereby forming a composite and attached to a substrate.

2. The removable fiber-reinforced traction mat of claim 1, wherein said cross-linked-closed-cell foam is selected from the group consisting of polyethylene-based poly olefin elastomer foam, ethylene vinyl acetate foam, ethylene-olefin inter-polymer foam, olefin block copolymer foam, polyolefin foam, cross-linked polyethylene foam, and blends thereof.

3. The removable fiber-reinforced traction mat of claim 1, wherein said synthetic woven textile fiber is selected from the group consisting of acetate, acrylic, Kevlar, latex, nylon, polyester, rayon, and spandex.

4. The removable fiber-reinforced traction mat of claim 1, wherein said synthetic woven textile fiber is polyester.

5. The removable fiber-reinforced traction mat composite of claim 1, wherein said substrate is a flat surface composed of fiberglass.

* * * * *